Figure 3:
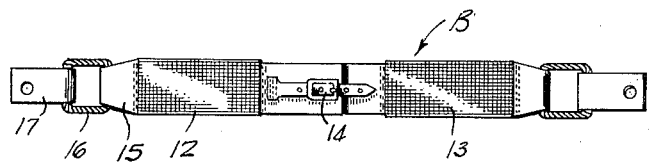

Sept. 5, 1950   R. B. COTTON   2,521,203
SAFETY BELT
Filed April 21, 1945

INVENTOR.
ROBERT B. COTTON
BY *John A. Robertson*
HIS ATTORNEY.

Patented Sept. 5, 1950

2,521,203

UNITED STATES PATENT OFFICE 2,521,203

SAFETY BELT

Robert B. Cotton, Lansdowne, Pa., assignor to All American Airways, Inc., a corporation of Delaware Application April 21, 1945, Serial No. 589,658

5 Claims. (Cl. 155—189)

This invention relates to safety belts such as are commonly employed in aircraft for maintaining the safe condition of personnel and is concerned primarily with that type of safety belts which is ordinarily employed to keep an operator or a passenger in a seated position.

At the present time safety belts of the type with which this invention is concerned are meeting with widespread usage in military as well as civilian aircraft. The equipment conventionally employed comprises a belt proper which has its ends anchored to the seat structure with the main portion passing over the abdomen of the user. Shoulder straps are ordinarily employed in conjunction with an abdominal belt of this type. Each shoulder strap has its ends anchored to the seat structure with the bend and intermediate portion receiving the shoulder of the wearer.

When safety belt equipment of this type is employed it must be capable of withstanding certain minimum stress requirements such as those laid down by the Civil Aeronautics Authority. It is evident that when a wearer of this equipment in an aircraft is subjected to the excessive shocks and strains such as are encountered in a crash landing, one of two things must occur. Either the safety belt equipment breaks with resulting injury to the wearer or the equipment holds but subjects the user to such shocks and strains as to in many cases cause serious injury. There are some cases of aircraft disasters in which the material evidence remaining after the accident indicates that a person has been almost cut in two by the safety belt.

With the foregoing conditions in mind this invention has in view as its foremost objective the provision, in safety belt equipment of the character indicated, of a body holding member which includes an element which will give and in giving absorb energy after certain predetermined stresses are exceeded.

More in detail the invention has as its object the provision, in safety belt equipment of the character above noted, of a body holding element which includes a section of an undrawn synthetic plastic which has the ability of absorbing energy as it is being drawn.

At the present time there are available to the public certain synthetic plastics which in their undrawn condition have the ability of absorbing energy as they are being drawn. Among these are noted undrawn nylon, polyethylene, Vinyon and Vinylite. Each of these substances is capable of absorbing energy as it is being drawn and this invention proposes to take advantage of this characteristic in providing a safety belt having improved safety features.

A further object of the invention is a provision, in safety equipment of the type indicated, of a belt including a main body portion which may be made from any substantially non-yielding material together with means for anchoring the extremities of the belt to the seat structure and one or more sections of an undrawn synthetic plastic having the ability of absorbing energy as it is being drawn. The sections of undrawn synthetic plastic will be so designed in accordance with the properties of the particular material being used as to preclude the possibility of drawing under normal operating conditions for the aircraft. However, should a person using the equipment be subjected to an excessive shock or strain such as would be caused by a crash landing, the ordinary stresses or strains are exceeded and this results in the sections of the safety belt drawing without injuring the wearer.

Various other more detailed objects and advantages of the invention such as arise in connection with the above noted ideas in a practical embodiment will in part become apparent and in part be hereinafter stated as a description of the invention proceeds.

The invention, therefore, comprising safety equipment for aircraft use which consists of a belt which has the ability of drawing or elongating after a certain predetermined safe stress is exceeded and which belt will absorb energy as it is being so elongated.

Figure 4:
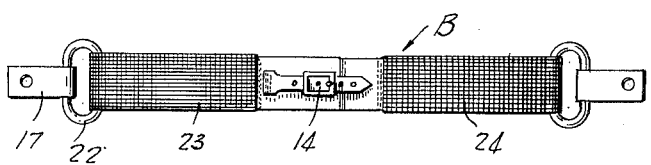
Figure 1:
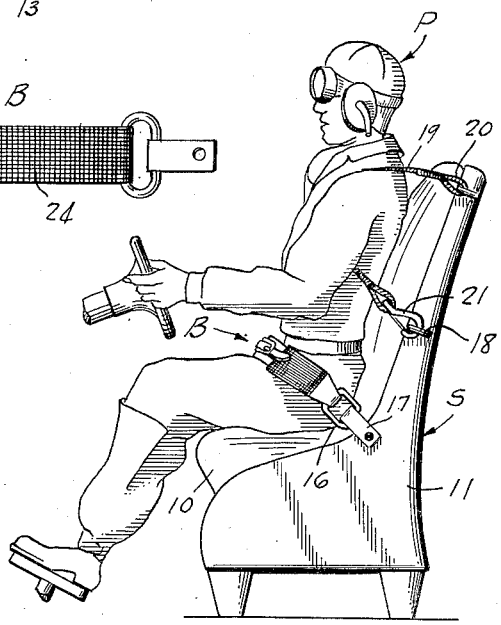
Figure 2:
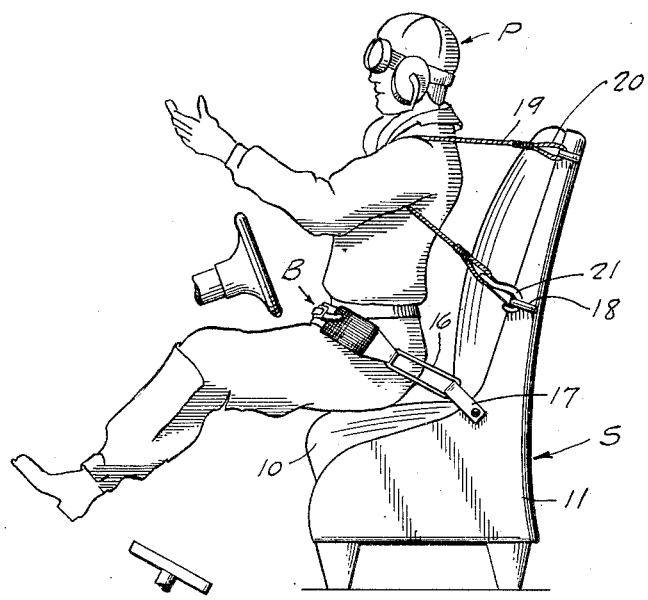

For a full and more complete understanding of the invention, reference may be had to the following description and accompanying drawing wherein:

Fig. 1 is a side view showing safety equipment designed in accordance with the precepts of this invention as it is being used, Fig. 2 is a similar side view showing the equipment after the energy absorbing action has taken place, Fig. 3 is a front elevational view of the belt per se, and Fig. 4 is a similar view of a modification.

Referring now to the drawing wherein like reference characters denote corresponding parts, and first more particularly to Fig. 1, a person who is seated in the seat of an aircraft is therein depicted. The person in this instance is represented as the pilot operating the plane although it is obvious that the equipment could be applied just as well to any passenger. The pilot is designated P while the seat of the the plane is referred to in in its entirety by the reference character S. The seat S comprises the usual upholstery 10 which is mounted on the rigid seat structure designated generally 11.

Referring for the moment more particularly to Fig. 3, an improved safety belt such as is provided in accordance with the teachings of this invention is therein illustrated and referred to in its entirety by the reference character B. The belt B comprises intermediate main body portions 12 and 13 which are adapted to be detachably connected by a buckle of any preferred type such as that shown at 14. Each of the main body parts 12 and 13 terminates in a loop 15. Linked onto the loop 15 is a section 16 which has the ability to draw and absorb energy as it is being drawn. At this point it is well to note that the invention is not to be confined to any particular material for the section 16. What is required of this element is that it have the ability to draw and elongate to an appreciable extent and while so drawing absorb a large amount of energy. Thus, the section 16 should be capable of at least 200% elongation and it also should be substantially non-elastic so far as the major part of the elongation is concerned. An important feature of the invention is the fact that there will be no slingshot action which would tend to virtually throw the user of the belt back against the seat. It has been found that undrawn nylon is a material which is particularly adapted to this usage. Among other materials are noted polyethylene, Vinyon and Vinylite. Regardless of which material is employed it should be treated to preserve its ability to draw and absorb energy as it is being drawn. Examples of treatments for this purpose are disclosed in the applications of Herbert E. Rose, Serial No. 633,551, filed December 7, 1945 and Serial No. 589,708, filed April 21, 1945, the first of which is now Patent No. 2,441,209, granted May 11, 1948, and the second of which has become abandoned. The section 16 is also linked onto anchoring loops 17 which are secured at either side to the seat structure 11.

The seat structure 11 may also include at each edge a pair of anchor eyes 18. A shoulder strap 19 which also is made from undrawn synthetic plastic having the ability to absorb energy as it is being drawn is anchored at one end to one of the eyes 18 in a permanent manner as by a closed loop 20 which is linked with the respective eye while the other end of the shoulder strap carries a snap fastener 21 which is designed for cooperation with the other eye 18. Obviously there is a shoulder strap 19 at each side of the seat.

While the mode of usage of the above described equipment is believed to be obvious, it may be briefly outlined by noting that the drawable section 16 of the belt B and the shoulder straps 19 are so designed that they will not draw until a certain predetermined stress is exceeded. Thus, an operator using the equipment first releases the snap fastening elements 21 from the eyes 18 and opens the buckle 14. After seating himself in the seat S he connects the elements of the buckle 14 and also places the shoulder straps 19 over his shoulders securing the snap fasteners to the eyes 18. Under ordinary service conditions the equipment will function in exactly the same manner as ordinary present day safety equipment of this type. That is, during the normal take off, flying, and landing operations, neither the belt B nor the shoulder straps 19 will draw. However, in the event of a crash landing or other comparable catastrophe which results in the predetermined stress being exceeded, the section 16 of the belt B will draw and absorb energy as it is being drawn. This is also true of the shoulder straps 19. Thus, the safety equipment does not break and in this manner injure the wearer and neither does it so hold the pilot P against excessive shocks or strains as to injure him.

Fig. 4 shows a slightly different modification. In this form the same anchors 17 for effecting the anchorage to the seat structure 11 are employed. However, the loop sections 22 are substantially non-yielding being made from a stiff metal or some similar material. The main body sections 23 and 24 which are joined in the same manner as above described in connection with Fig. 3 by buckle 14 are in this instance woven from yarn of the undrawn synthetic plastic type such as undrawn nylon. Thus, it is sections 23 and 24 which have the ability to draw and absorb energy during the drawing operation.

While a preferred specific embodiment of the invention is hereinbefore set forth, it is to be clearly understood that the invention is not to be limited to the exact constructions illustrated and described because various modifications of these details may be provided in putting the invention into practice within the purview of the appended claims.

What is claimed is:

1. A compound shock absorbing safety belt for connection to each side of an aircraft seat, comprising operatively coupled sections, at least one of said sections being formed of undrawn synthetic plastic fiber webbing capable of permanent elongation at a predetermined load thereon and having the ability to absorb energy during such elongation.

2. A flexible shock absorbing body embracing safety means for vehicles including a section of material that is capable of inelastic permanent elongation of at least 200% at predetermined loads in excess of ordinary service conditions and has the ability of absorbing energy as it is elongating, and connecting means for said body embracing means arranged for connection to a fixed member on the vehicle, said material being treated to preserve its shock absorbing properties.

3. In a safety strap for aircraft seat connections, a section made from undrawn synthetic plastic fibers, and fastening means at one end of said section adapted to be coupled to an aircraft seat connection, said undrawn fibers being capable of permanent elongation of at least 200% under predetermined loads and while so elongating absorbing energy and serving as a shock absorber.

4. For use in protecting a human being against injury from excessively rapid acceleration or deceleration, a harness adapted to encircle and support the body, and a flexible connecting element extending from said harness and constructed and arranged for connection to a member capable of non-uniform change in velocity wherein the rate of change exceeds the injury threshold during only a small fraction of the total change period, said connecting element being constructed at least in part of undrawn nylon capable of energy absorption by inelastic elongation of at least 200% and being constructed and arranged more or less permanently to elongate during said small fraction thereby to maintain maximum rate of change below the injury threshold.

5. For use in protecting a human being against injury from excessively rapid acceleration or deceleration, a harness adapted to encircle and support the body, and a flexible connecting element extending from said harness and constructed and arranged for connection to a member capable of non-uniform rate of change of velocity wherein said rate of change exceeds the injury threshold during only a small fraction of the total period, said connecting element being constructed at least in part of undrawn synthetic fibers extending in the direction of stress and capable of energy absorption by inelastic elongation of at least 200%, and being constructed and arranged more or less permanently to elongate during said small fraction thereby to maintain maximum deceleration below the injury threshold.

ROBERT B. COTTON.

REFERENCES CITED

The following references are of record in the file of this patent:

UNITED STATES PATENTS

| Number | Name | Date |
|---|---|---|
| 894,052 | Radtke | July 2, 1908 |
| 1,050,874 | Twombly | Jan. 21, 1913 |
| 2,263,348 | Barros | Jan. 21, 1941 |
| 2,275,450 | Manson | Mar. 10, 1942 |
| 2,292,386 | Manson | Aug. 11, 1942 |
| 2,312,946 | Watter | Mar. 2, 1943 |
| 2,343,892 | Dodge | Mar. 14, 1944 |
| 2,441,209 | Rose | May 11, 1948 |

FOREIGN PATENTS

| Number | Country | Date |
|---|---|---|
| 331,926 | France | Aug. 11, 1903 |
| 362,235 | France | Mar. 31, 1906 |
| 539,002 | Germany | Nov. 5, 1931 |
| 582,985 | France | Oct. 24, 1924 |

OTHER REFERENCES

"Handbook of Plastics," Simonds & Ellis, July 1943. D. Van Nostrand Co. Inc., 250 Fourth Ave., N. Y.